(No Model.)
H. B. EARECKSON.
LUBRICATOR FOR VEHICLE AXLES.
No. 536,072. Patented Mar. 19, 1895.
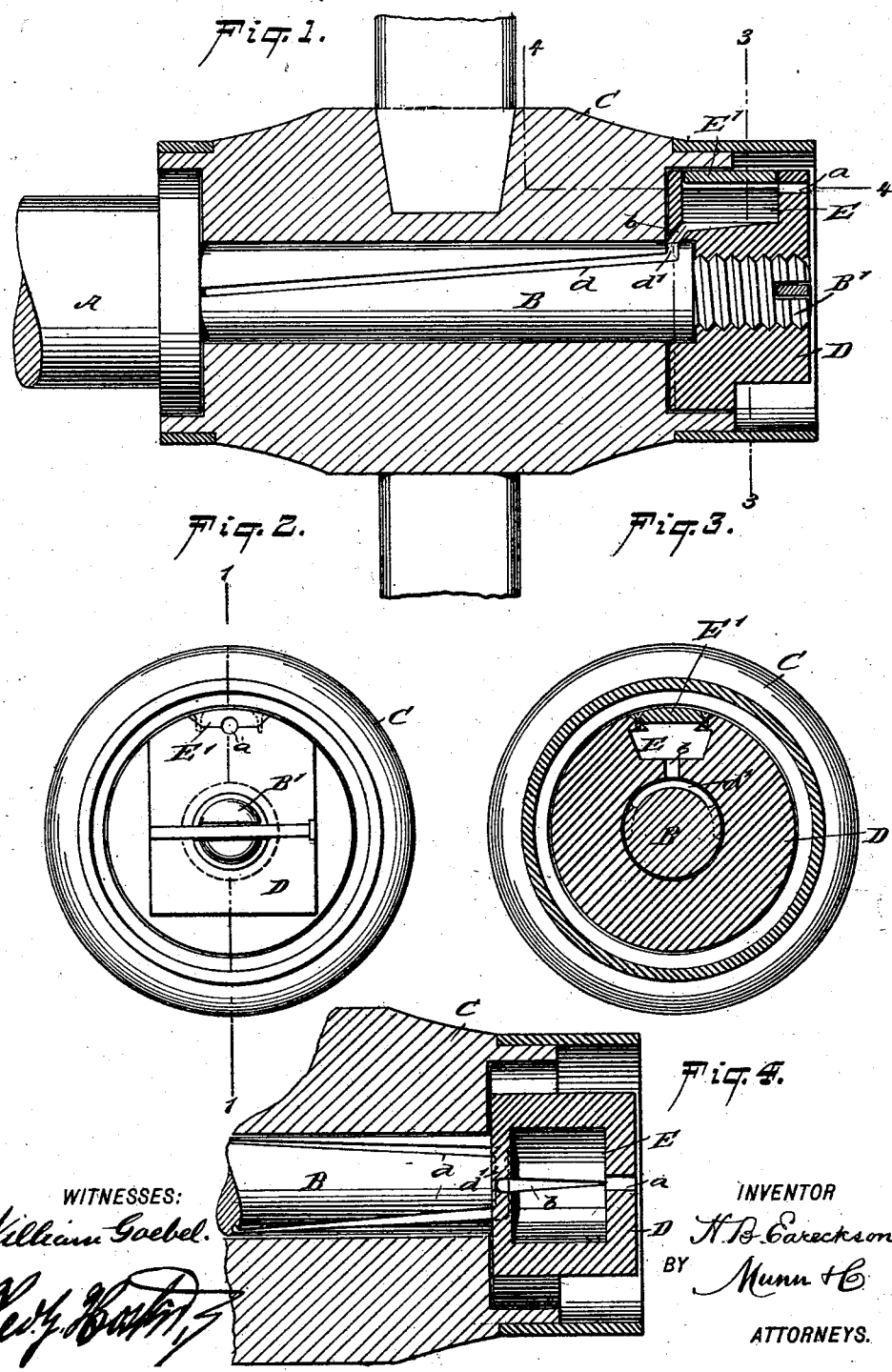
WITNESSES:
William Goebel.
INVENTOR
H. B. Eareckson
BY
Munn & Co.
ATTORNEYS.

United States Patent Office.

HENRY B. EARECKSON, OF NEW YORK, N. Y.

LUBRICATOR FOR VEHICLE-AXLES.

SPECIFICATION forming part of Letters Patent No. 536,072, dated March 19, 1895.

Application filed December 27, 1894. Serial No. 533,079. (No model.)

*To all whom it may concern:*

Be it known that I, HENRY B. EARECKSON, of New York city, in the county and State of New York, have invented a new and Improved Lubricator for Vehicle-Axles, of which the following is a full, clear, and exact description.

The object of the invention is to provide a new and improved lubricator, more especially designed for vehicle axles, and arranged in such a manner that its spindle is properly and conveniently lubricated without requiring the removal of the wheel, at the same time preventing dust and other impurities from passing to the spindle.

The invention consists of a nut adapted to be secured on the threaded end of the axle spindle, and provided on its top with an oil chamber having an opening leading to the upper end of the feed groove arranged on the said spindle.

The invention also consists of certain parts and details and combinations of the same, as will be fully described hereinafter and then pointed out in the claim.

Reference is to be had to the accompanying drawings, forming a part of this specification, in which similar letters of reference indicate corresponding parts in all the figures.

Figure 1 is a sectional side elevation of the improvement as applied, on the line 1—1 of Fig. 2. Fig. 2 is an end view of the same. Fig. 3 is a transverse section of the same, on the line 3—3 of Fig. 1; and Fig. 4 is a sectional plan view of the same, on the line 4—4 of Fig. 1.

The axle A is provided on each end with the usual spindle B, on which is mounted to rotate loosely the hub C of the vehicle wheel. On the reduced threaded end B' of the spindle B, screws a nut D for holding the hub C in position on the spindle, the said nut being adapted to be locked in place by a suitable nut lock preferably, however, of the construction shown and described in the application for Letters Patent, Serial No. 533,080, filed of even date herewith.

The inner end of the nut D fits partly over the outer end of the spindle B, as is plainly indicated in Fig. 1, and in the top of this nut D is formed a chamber E adapted to contain the lubricant introduced into the chamber through an opening $a$, extending from the chamber to the face of the nut, as is plainly illustrated in the drawings.

The chamber E is provided with a cover E', secured in place by screws or other means to permit of removing the cover for cleaning the chamber whenever required. In the bottom of the chamber E is arranged a discharge opening $b$, leading from the rear end of the chamber downward to the top $d'$ of the feed groove $d$, formed in an inclined direction on the sides of the spindle B, as plainly indicated in Figs. 1 and 4. Thus the lubricant from the chamber E can pass through the opening $b$ into the top groove $d'$, from which the lubricant can flow, by its own gravity, down the sides of the feed grooves $d$ to lubricate the spindle and hub throughout their length. The chamber E is made sufficiently large to contain quite a quantity of the lubricant, and the said chamber can be refilled from time to time according to the need of the vehicle.

It will be seen that the nut D fits in the usual band opening in the outer end of the hub C, so that comparatively little dust or other impurities can pass through the spindle. When it is desired to clean the chamber E or otherwise examine the spindle by removal of the hub C, the nut D is first unlocked and then unscrewed from the threaded end B' to permit of removing the cover E' to get access to the chamber E. The removal of the nut D also permits of removing the hub C for examining the spindle.

It will be seen that this device is very simple in construction, not liable to get out of order, and as the chamber is an integral part of the nut and always in proper position, there is no danger of wasting the lubricant.

Having thus fully described my invention, I claim as new and desire to secure by Letters Patent—

The combination of an axle or the like, having a longitudinal groove in its surface and provided with a screw-threaded end portion, a nut screwing on the screw-threaded portion of the axle and provided with a cavity forming a lubricant receptacle provided with an open top and having an outlet communicating with the groove in the axle, the front wall of
5 the said receptacle being provided with a filling aperture formed through it, a cover arranged on the open top of the receptacle and screws for holding said cover in place, substantially as set forth.

HENRY B. EARECKSON.

Witnesses:
THEO. G. HOSTER,
C. SEDGWICK.